United States Patent [19]

Bury

[11] 4,167,259

[45] Sep. 11, 1979

[54] ADHESIVE FASTENING DEVICE

[75] Inventor: George J. Bury, Lake Villa, Ill.

[73] Assignee: Illinois Tool Works Inc., Chicago, Ill.

[21] Appl. No.: 838,039

[22] Filed: Sep. 29, 1977

[51] Int. Cl.² ............................................. A47B 96/06
[52] U.S. Cl. ................................ 248/205 A; 24/73 VA
[58] Field of Search .................. 248/205 A; 52/309.3, 52/366; 24/73 VA; 85/9 R, 35; 151/41.7; 156/380

[56] References Cited

U.S. PATENT DOCUMENTS

| | | | |
|---|---|---|---|
| 2,102,902 | 12/1937 | Lenke | 85/9 R |
| 2,183,440 | 12/1939 | Barnicoat | 85/9 R |
| 2,366,459 | 1/1945 | Rosa | 85/9 R UX |
| 2,385,296 | 9/1945 | Moore | 248/205 A UX |
| 2,789,615 | 4/1957 | Allen | 151/41.7 |
| 3,637,181 | 1/1972 | Janssen | 248/205 A |
| 3,928,894 | 12/1975 | Bury et al. | 24/73 |
| 4,045,076 | 8/1977 | Day et al. | 151/41.7 X |

FOREIGN PATENT DOCUMENTS

| | | | |
|---|---|---|---|
| 1405668 | 12/1965 | France | 151/41.7 |
| 788329 | 12/1957 | United Kingdom | 151/41.7 |

*Primary Examiner*—J. Franklin Foss
*Attorney, Agent, or Firm*—Thomas W. Buckman; Robert W. Beart

[57] ABSTRACT

A device adapted to be adhesively secured to a primary work surface to facilitate the securement of a secondary workpiece to said primary work surface. The device will include a plate-like base with a layer of heat activable adhesive on its undersurface and a pair of parallel side edge flanges extending upwardly from the base serving as a means to align the device beneath the legs of a U-shaped induction heating core and a spacing between the end faces of the legs of the core and the adhesive layer.

4 Claims, 5 Drawing Figures

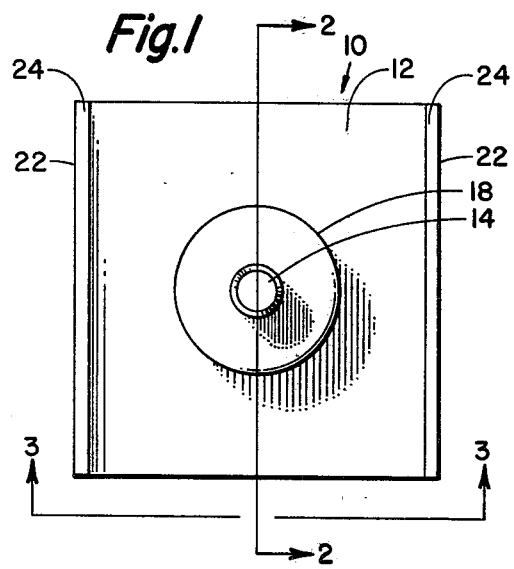
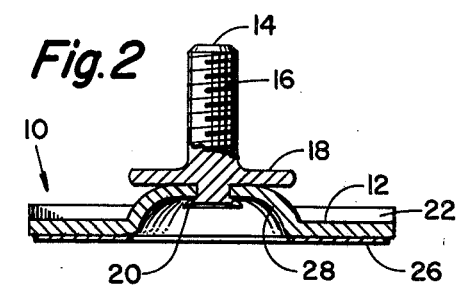
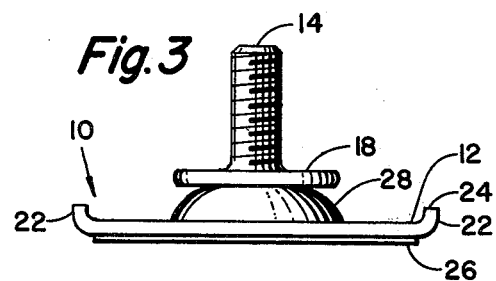
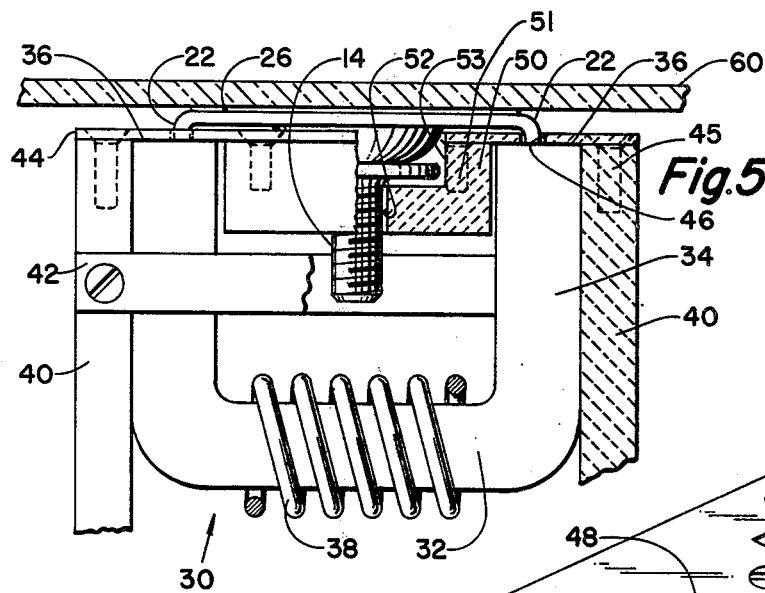
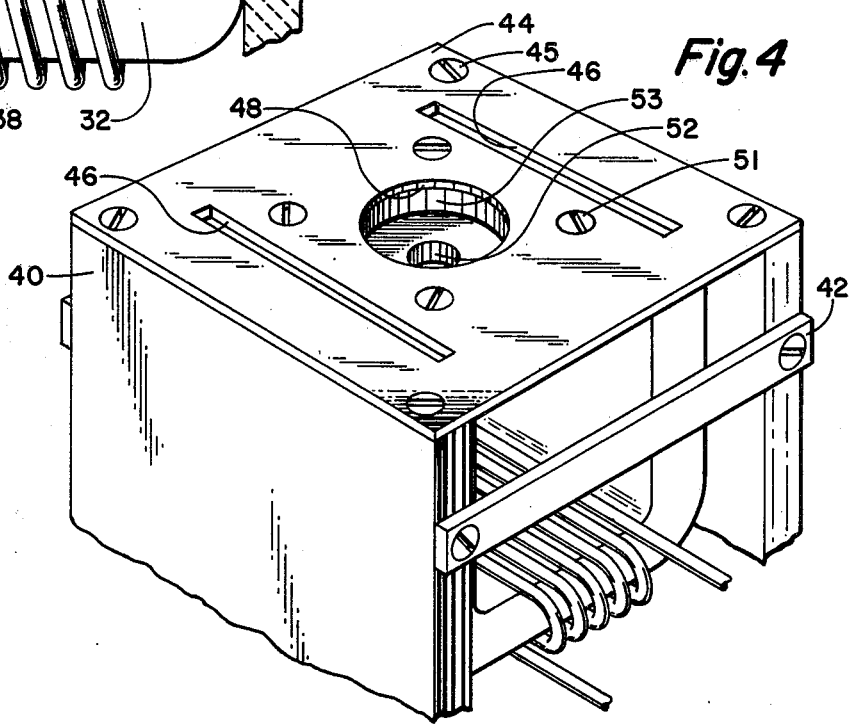

ADHESIVE FASTENING DEVICE

BACKGROUND OF THE INVENTION

This invention relates broadly to a fastening device adapted to be secured adhesively to a primary work surface.

The invention more particularly relates to an adhesive fastening device designed to be secured and activated through the use of a U-shaped induction core.

The use of a U-shaped core with an exciter coil wound about a portion of the core to activate adhesive carrying devices is a highly efficient system. The legs of the core preferably abut the upper surface of an adhesive carrying device so that the device completes a magnetic flux circuit between the legs of the core thereby creating heat in the device by eddy currents and a hysteresis effect. The heat created in the device is conducted to the adhesive layer to raise it to its activating temperature and thus secure the device to a primary work surface. Since the flux density created in the fastener device is a critical parameter in achieving efficient heating, the device and the end faces of the core must be properly and carefully aligned to maximize the flux density and, of course, minimize the heat losses in the system. A proper bond also requires a sufficient amount of pressure applied to the device to insure that a proper wetting action exists between the faying surfaces of the device and the work surface. It, therefore, becomes advantageous to use the U-shaped core as a pressure applying instrument as well as a heat generating instrument. Since the maximum utilization of adhesive and metal in an adhesive fastening device requires that the adhesive layer be closely adjacent to the margins of the device, the application of force on the device by the core during heating could cause adhesive to be forced outwardly toward the periphery of the device and into engagement with the end faces of the core. Such adhesive deposits on the core will harmfully affect subsequent similar applications because the end faces will not be capable of maintaining the close, critical spacing between the device to be heated and the end face. Such a spacing is directly related to the flux density and the heat created in the device and should be critically controlled.

It is, therefore, an object of the invention to provide an adhesive fastening device with structure that will permit a U-shaped core to apply pressure to the device during the heating thereof without harming the end surface of the core.

Still another object of the invention is to provide an adhesive fastening device with a means to accurately align the device with the end faces of an associated U-shaped core.

The above and other objects and advantages of the invention are fulfilled by an adhesive fastening device basically comprising a flat base having a pair of side marginal edges upturned so as to form parallel flanges. The flanges will extend a short distance perpendicularly to the base and preferably a distance not substantially greater than the thickness of the base. A secondary attachment means is, preferably integrally, formed on the base. This secondary means may take the form of an upstanding threaded stud, to permit subsequent fastening of a secondary workpiece to the fastening device after the adhesive fastener has been secured to the primary work surface. The upstanding flanges serve two important purposes in an attachment system utilizing a U-shaped core. Firstly, they provide means to carefully and predicably orient the device with the end surfaces of a core. This is accomplished, in a preferred embodiment, with an orienting structure having slots designed to register with the flanges and which are fixedly secured to the core so that the upturned edges are aligned with and abut the end surfaces of the core. Secondly, the edges provide a slight spacing between the adhesive layer and the region of abutting contact between the core and the device to minimize the probability that adhesive will flow outwardly from the perimeter of the device and into contact with end faces.

Other objects and advantages of this invention will become apparent upon reading the following detailed description and upon reference to the drawings.

BRIEF DESCRIPTION OF THE DRAWINGS

FIG. 1 is a top plan view of an adhesive fastening device of the present invention.

FIG. 2 is a transverse cross section taken along lines 2—2 of FIG. 1.

FIG. 3 is an end elevational view of the adhesive fastening device of FIG. 1 and taken in the direction of lines 3—3 of FIG. 1.

FIG. 4 is a perspective view of a U-shaped core and orienting fixture used in association with the adhesive fastening device.

FIG. 5 is an elevational view in partial section of the core and fixture of FIG. 4 used in association with the adhesive fastening device.

DETAILED DESCRIPTION OF THE PREFERRED EMBODIMENTS

Turning first to FIGS. 1-3 there is shown a fastening device 10 basically comprising a substantially flat, plate-like base 12 with a stud-like fastener 14 with threads 16 impressed thereon preassembled to the base and extending upwardly therefrom. The base is shown to be generally rectangular and including a pair of opposed side margins 22 which are upturned slightly to be configured as flanges extending generally transverse to the plane of the base. The undersurface of the base is coated with an adhesive layer 26.

Plate-like fasteners, including an upstanding threaded stud designed to be secured to the primary workpiece by an adhesive layer, are generally well known in the art. A convenient manner of securing such an adhesive carrying device is through the use of a U-shaped induction core with an exciter coil wound about the bridge section of the core. The legs of such a core are positioned to abut the upper surface of the base of the fastener and the exciter coil is energized to create a magnetic flux circuit between the legs of the core and the base. The flux density thus created in the base generates heat, primarily through eddy currents and a hysteresis effect, sufficient enough to activate the adhesive layer.

In such an adhesive fastening system utilizing a U-shaped core, it is desirable to exert compressive force on the adhesive layer through the U-shaped core while the adhesive is heated so that the faying surfaces of the support structure and adhesive device achieve maximization of wetting.

Obviously, in applying force to a device of the type described, the adhesive will tend to be forced laterally outwardly and quite frequently beyond the margins of the device. With the end surfaces of the core abutting the plate of the fastening device, preferably closely adjacent to the edges of the device and quite often overlapping the edges, it is possible that adhesive may come in contact with these end faces. Subsequent use of a U-shaped core that has been contaminated by the deposition of excess adhesive on the end surfaces will create an increasingly harmful situation in that the end surfaces may no longer be able to be in direct contact with the surface being heated and will frequently be spaced from the surface an extent so as to decrease the flux density in the end surface. In addition, alignment problems because of deposits of adhesive on the end surfaces may occur. It is this problem that the design of the present invention overcomes.

Upturned flange regions 22 are shown to be substantially parallel and generally perpendicular to the flat base 12 and will preferably extend so that the top edges 24 of the flanges are spaced a distance from the upper surface of the base not substantially greater than the thickness of the base so as to minimize the flux loss. With such an arrangement, the end surfaces of a U-shaped core then directly abut the upper surfaces 24 of the flange and are thus spaced slightly form the adhesive layer to eliminate the problem aforementioned.

Turning to FIGS. 4 and 5, a particular head structure incorporated in a U-shaped core is shown which is advantageously used in association with a device such as device 10. A U-shaped core 30 includes basically a pair of legs 34 interconnected by a bridge portion 32 with an exciter coil 38 wound thereabout. The end surfaces 36 of the legs are adapted to abut the article to be heated in a manner known in the prior art. However, it becomes important to carefully align the surfaces to be abutted with the core and, therefore, a frame structure is secured to the core including means to reliably and consistently orient a device to the end surfaces of the core.

Side frame members 40 of an insulative material and cross frame members 42 surround the U-shaped core. An end plate member 44 of an insulative material is secured to the side frame members through the use of screw-type fasteners 45. An insert block 50 of an insulating material is secured to the end plate by fasteners 51 and located intermediate the legs of the core. This block includes a through aperture 52 and a counterbore 53 to accept respectively the stud 14 and flange 18 associated with the stud. Elongated, narrow, through slots 46 are formed in the base on either side of an aperture 48, which is aligned with the counterbore 53 of the insert block. The elongated slot 46 are generally parallel to one another and are aligned with end surfaces 36 on the core.

In operation, the upturned flanges 22 of the device 10 register with the slots 46 to carefully and predictably align each part 10 with an associated end surface on the core of the heating head. Thus, such a head structure in cooperation with the particularly designed device 10 insures that a succession of such devices to be secured to a given support structure 60 are all applied under substantially identical conditions. The upturned flanges permit direct contact between the core and article being heated, but prevent adhesive from being deposited on the end faces of the core during the application of heat and pressure to the article by the core.

Attention is again directed to FIGS. 1-3 wherein an annular flange 18 is shown to be integral with the stud 16. Such structure serves to absorb any bending forces applied to the unit and eliminates the possibility that the swaged attachment region 20 will become disassociated from the dome-shaped protuberance 28 while the interaction between flange 18 and dome 28 may serve to absorb undesired bending loads from acting on the adhesive bond line.

Thus, it is apparent that there has been provided, in accordance with the invention, an adhesive fastening device that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. An adhesive fastening device for securing a secondary workpiece to a primary work surface through the use of a U-shaped induction core to induce heat in the device, the device including a plate-like base of ferromagnetic material having a substantially uniform, predetermined cross-sectional thickness, the periphery of the plate including a pair of parallel side edges, said parallel edges being upturned, presenting marginal flanges extending in planes perpendicular to the plane of the top surface of the plate the topmost surface of the flanges having a width substantially equal to the thickness of the plate and said top surface of the flanges being located in a plane parallel to the plane of the top surface of the plate spaced from the top surface of the plate a distance not substantially greater than the predetermined thickness of the base, the bottommost surface of the plate being coated with a layer of heat activable adhesive adapted to fixedly secure the fastening device to the primary work surface upon application of heat to said adhesive by the generation of flux in the base by the U-shaped core when the end surfaces of the core are positioned to abut the upper surfaces of the flange, means integral with said plate-like base for the securement of a secondary workpiece to said fastening device and therefore to said primary work surface wherein the minimum width of the upper flange surface in conjunction with the minimum spacing of the upper flange surface from the top surface reduces the heat loss in the vicinity of the parallel side edges while permitting the flux path to be efficiently transferred through the plate and provide sufficient space between the core and the adhesive layer.

2. The adhesive fastening device of claim 1, wherein the base is rectangular in peripheral configuration.

3. The adhesive fastening device of claim 1, wherein the means to secure the secondary workpiece consists of a threaded stud extending upwardly from said base located substantially equidistant between said parallel side edges.

4. The adhesive fastening device of claim 3, wherein the stud is staked to the base and includes an annular flange integral with the stud bearing against an upwardly extending dome in the top surface of the base.

* * * * *